R. MIEHLE.
FUEL AND WATER REGULATOR FOR STEAM BOILERS.
APPLICATION FILED SEPT. 26, 1907.
1,026,761.
Patented May 21, 1912.
4 SHEETS—SHEET 2.
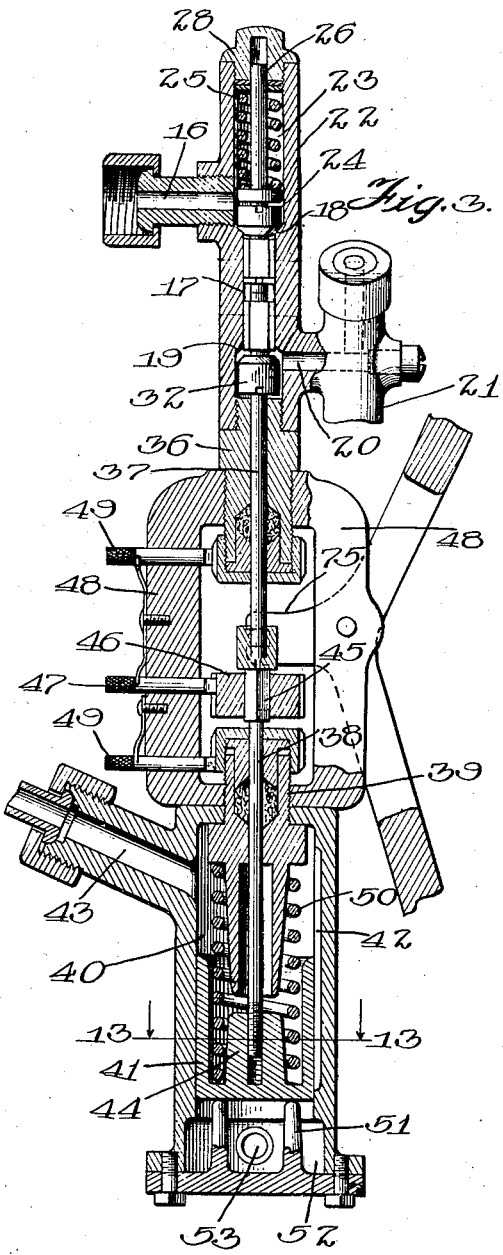
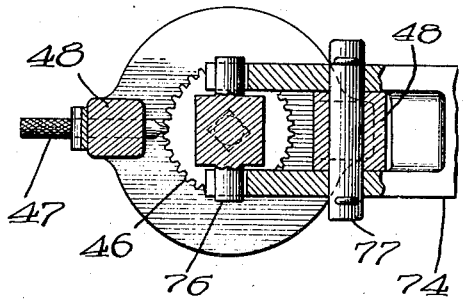
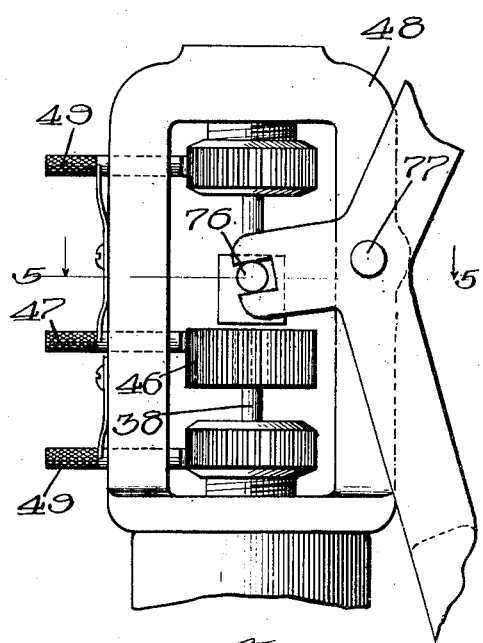
Witnesses:
Inventor:
Robert Miehle

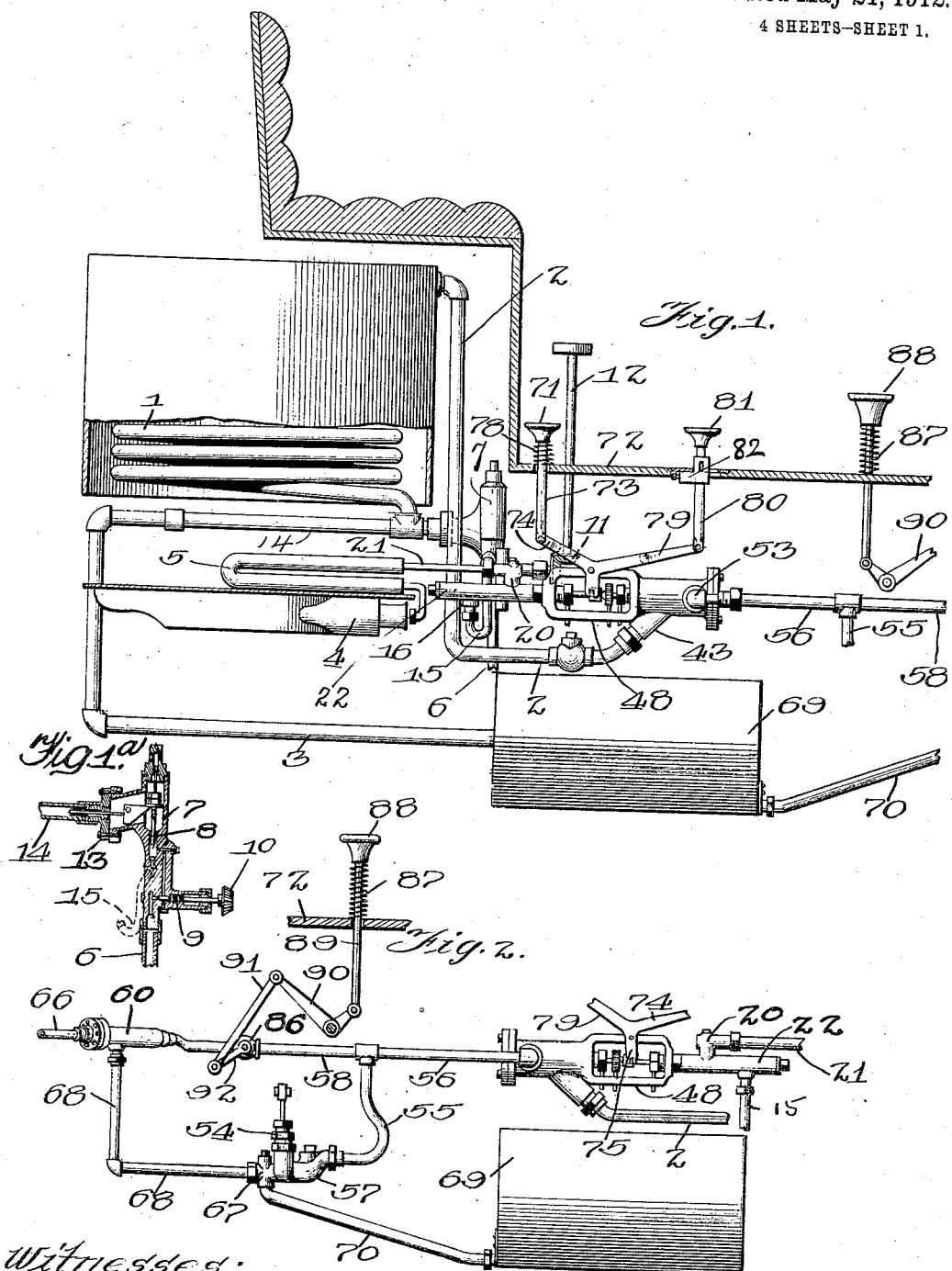

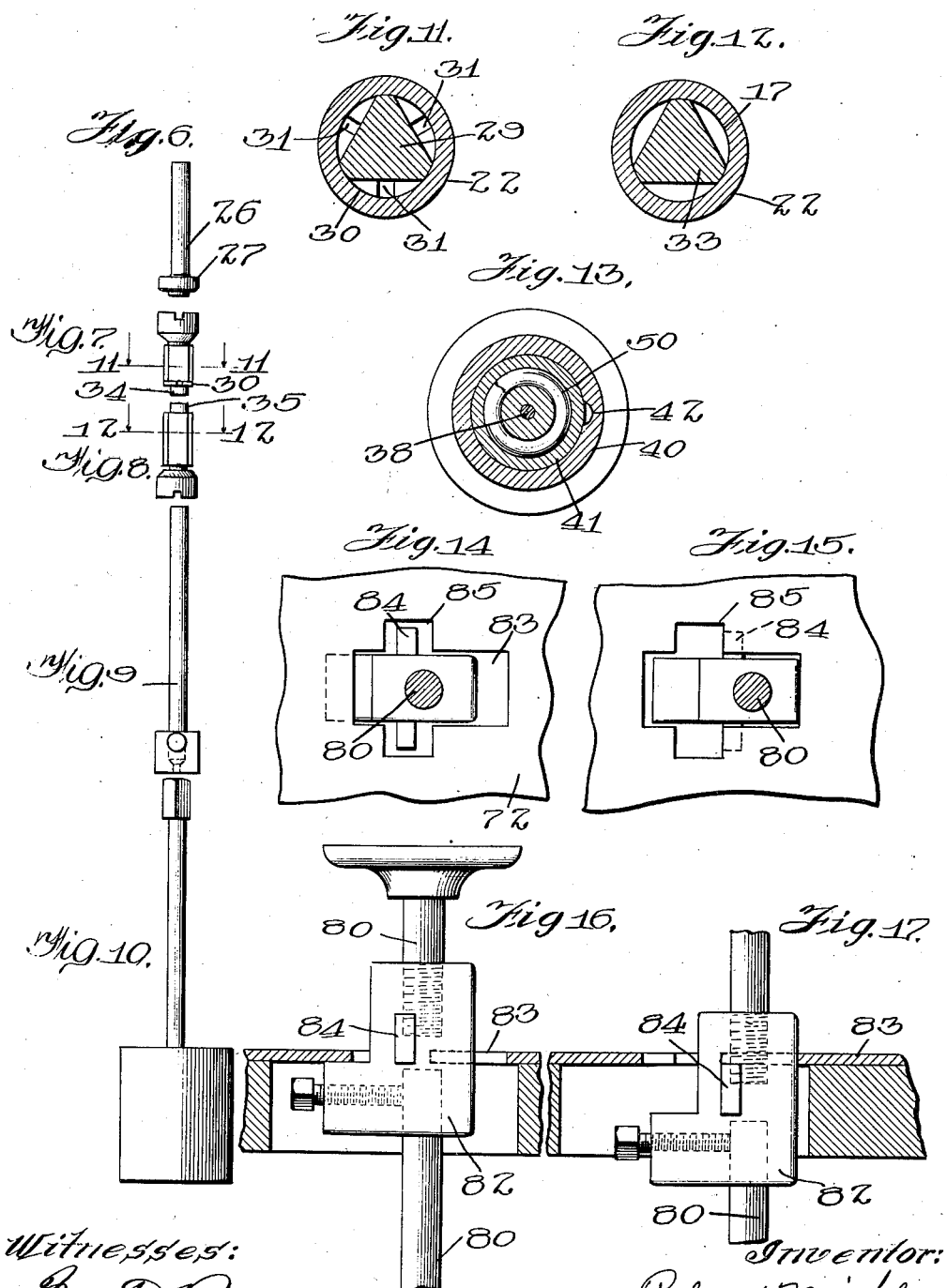

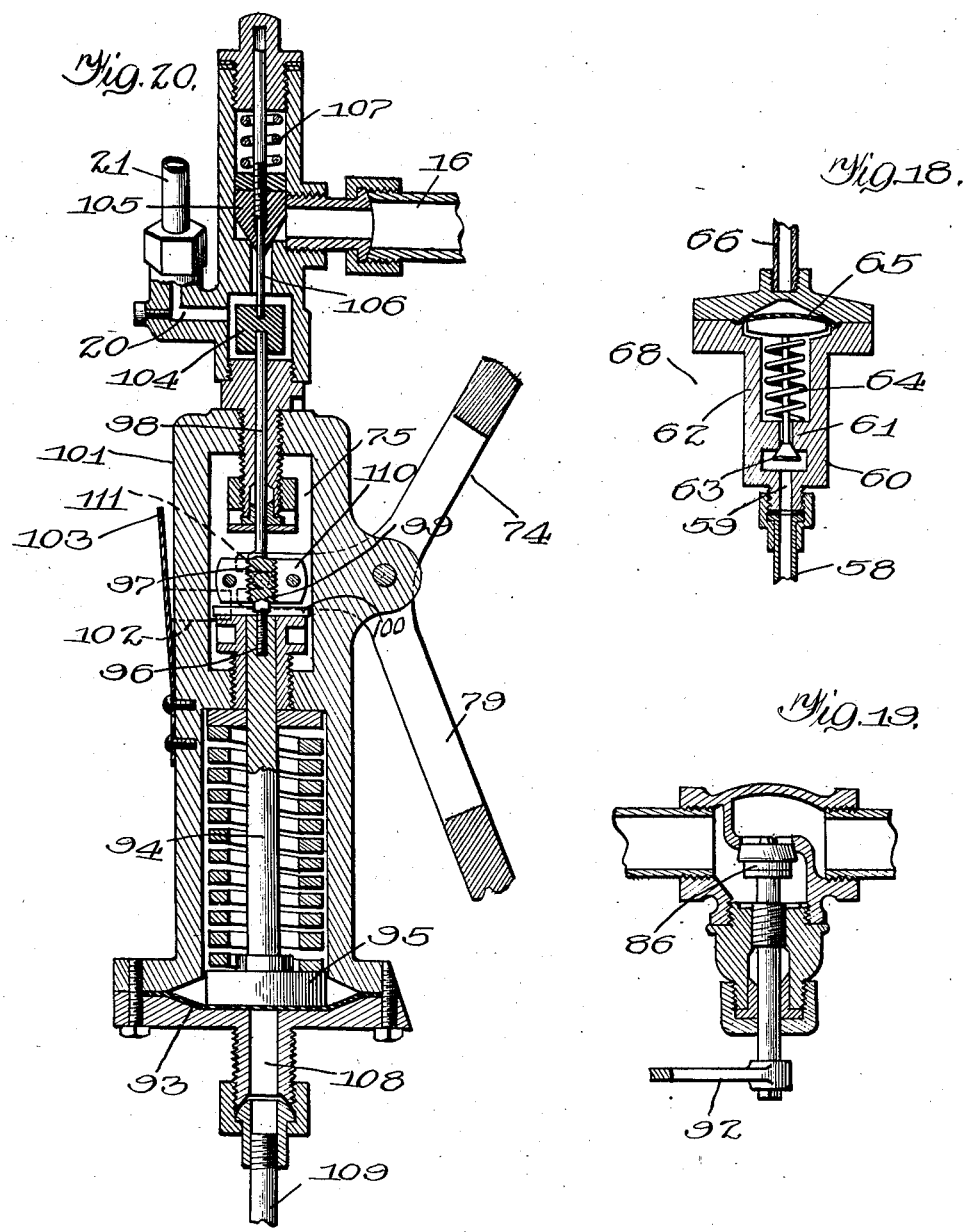

UNITED STATES PATENT OFFICE.

ROBERT MIEHLE, OF CHICAGO, ILLINOIS.

FUEL AND WATER REGULATOR FOR STEAM-BOILERS.

1,026,761.       Specification of Letters Patent.     Patented May 21, 1912.

Application filed September 26, 1907. Serial No. 394,605.

*To all whom it may concern:*

Be it known that I, ROBERT MIEHLE, a citizen of the United States, residing in Chicago, in the county of Cook and State of Illinois, have invented certain new and useful Improvements in Fuel and Water Regulators for Steam-Boilers, of which the following is a full, clear, and exact specification.

This invention relates more particularly to that class of steam boilers known as flash boilers or semi-flash boilers and the means for regulating the pressure of the steam therein employed on motor vehicles and in connection with which it is usual to employ a means of governing the amount of water passing into the boiler or generator by the heat of the steam generated from such water and to also govern this amount of water by the pressure of the steam in the generator, the water being continuously pumped while the engine is in operation and passing to the boiler or not accordingly as the pressure in the boiler is above or below a certain degree where the same acts to open a by-pass for connecting both sides of the pump together. In these systems it is also usual to employ a fluid pressure regulator which is acted upon by the pressure of the water coming from the pump when the pressure of the steam in the generator is below the said predetermined grade, and serves to open a valve which permits a fluid fuel to pass to the burner which heats the generator or boiler.

Two main objections have been experienced in the use of these systems, the first and most serious of which is that the water pumping system supplies less water to the generator than is required by the amount of fuel permitted to pass to the burner by the pressure regulator or the fluid pressure regulator, which is technically termed in this art "the flow regulator", and as a consequence the engine not only fails to receive the full quota of steam required by conditions at that time but the generator or boiler is over-heated and seriously damaged. If, on the other hand, the adjustment of the flow regulator should be such as to give a surplus of water to insure against damage to the boiler, then another serious objection of having wet and inefficient steam would result. The second objection is that the automatic pressure regulator which opens the pump by-pass when the pressure of the steam in the boiler reaches the aforesaid predetermined degree of pressure, will open that by-pass at times when a much higher pressure and a further quantity of water is required in the boiler as, for example, when the machine is ascending a steep grade and a pressure above the working normal is therefore necessary. At such times, however, the said by-pass will open and not only prevent the water from passing into the generator or boiler but will relieve the pressure on the flow regulator and thereby reduce the fuel supply to the burner.

This invention is designed to avoid these defects and it has for one of its important objects to combine a thermostatic regulator or regulator for controlling the amount of fuel passing to the burner by the degree of heat in the generator, with a flow regulator which will also control the amount of fuel passing to the burner by the pressure of the flowing water coming from the water feed pump, so that the supply of fuel to the burner will be shut off or reduced in the event the water supply to the generator should be abnormally decreased, and it will be shut off by the temperature of the generator and not merely by the action of the flow regulator which depends for its operation upon the degree of pressure exerted against it by the feed pump.

Another object of the invention is to provide a system of the described character with improved means whereby the pressure of the steam in the generator will automatically open the pump by-pass and prevent the water from passing to the boiler or generator and the boiler may, nevertheless, be supplied at will with any desired quantity of water independently of said by-pass.

With a view to the attainment of these ends and the accomplishment of certain other objects, which will hereinafter appear, the invention consists in the features of novelty in the construction, combination and arrangement of the parts hereinafter described with reference to the accompanying drawings and more particularly pointed out in the claims.

In the said drawings, Figure 1 is a side elevation of a steam generator and the burner therefor, provided with my improvements, the same being shown as applied to a motor vehicle. Fig. 1ᵃ is a detail vertical sectional view of a part of the thermostatic mechanism. Fig. 2 is a side elevation of some of the same parts looking from the opposite side to that presented in Fig. 1. Fig. 3 is an enlarged detail longitudinal section of the flow regulator hereinafter described. Fig. 4 is a side elevation of a portion of the same on a still greater scale. Fig. 5 is a transverse section on the line 5—5, Fig. 4. Figs. 6 to 10 inclusive are detail views of various elements composing the flow regulator. Fig. 11 is a transverse section on an enlarged scale taken on the line 11—11, Fig. 7. Fig. 12 is a transverse section on the line 12—12, Fig. 8 taken on an enlarged scale. Fig. 13 is a transverse section taken on the line 13—13, Fig. 3. Figs. 14 and 15 are detail plan views partly in section of a locking means for one of the foot buttons hereinafter described. Figs. 16 and 17 are side elevations partly in vertical section of the same in different positions. Fig. 18 is a detail longitudinal section of the by-pass valve regulator hereinafter described. Fig. 19 is a detail sectional view of the manually operated valve in the by-pass pipe shown on an enlarged scale, and Fig. 20 is a view similar to Fig. 3, showing a modified form of flow regulator.

1 is the generator or steam boiler which in this exemplification of the invention is shown in the usual form of coil, the inlet end of the coil being indicated at 2 and the outlet end, which supplies steam to the engine or other place of consumption, being shown at 3.

4 is the fluid fuel burner provided for heating the coil 1. 5 is the gas generator which supplies said burner with the fluid fuel and which receives its supply of liquid fuel, such as gasolene or kerosene, from a supply pipe 6 which leads the fuel to a chamber 7 containing the thermostatically controlled valve 8. Interposed between this valve and the supply pipe 6 may also be employed, if desired, a manually controlled valve 9, whose stem is provided with beveled gear 10 meshing with a companion gear 11, on a manually operated shaft 12, so that when desired the supply of fuel may be entirely shut off by hand independently of the thermostatic valve 8. The thermostat which controls this valve 8 may be of the usual or any suitable type. In this form of the invention, it is not materially different from that ordinarily employed in systems of this character and consists of a thermostatic bar 13 arranged in a tube 14 located over the burner 4 and connected directly with the generator coil 1, whereby the bar 13 will receive the heat of the steam in said coil and control the position of the valve 8 accordingly. Any other form of thermostat, however, which will serve to close the valve 8 or cause it to partially close when the temperature in the generator rises above a predetermined degree and to open it or permit it to open when such temperature falls below such degree, will suffice so far as the principles of the present invention are concerned.

The valve 8 controls the discharge of the fluid fuel from the chamber 7 which takes place through a connection 15 and which connection leads directly to the fuel inlet port 16 of the flow regulator, better shown in Fig. 3. The port 16 leads into a fuel passage 17 having a valve seat 18 at one end and a similar seat 19 at the other end, these seats being turned in opposite directions, and from this passage 17 leads a port or passage 20 connecting with pipe 21 which conducts the liquid fuel which may have found its way past the valve 8 directly into the gas generator 5. The fuel passage 17 is formed in a fitting 22, in one end of which is a valve chamber 23 containing a valve 24 adapted to close as at 17 by engaging seat 18. This valve is pressed to its seat by a spring 25 arranged in the chamber 23 around a stem 26 and bears against a head or flange 27 on the end of said stem, the head 27 taking its bearing against the back of valve 24. The outer end of stem 26 is sustained and guided by a cap 28 which closes the end of chamber 23. The valve 24 is provided with a stem 29 having flattened sides for the passage of the gasolene or other fuel and the extreme end of this stem is provided with a circular portion 30 which is not flattened, but which is formed with notches 31 for the passage of the gasolene, the circular portion being of a suitable diameter for fitting easily within the passage 17. Arranged opposite and adapted to close against the other valve seat 19 in this passage is a valve 32 and this also has a flattened guide stem 33 working in the passage 17 and the two guide stems 29, 33, are provided with projections 34, 35 adapted to abut together when either valve is pushed to its seat, these projections 34, 35 being adapted to be filed off more or less for gaging the distance between the valves, should it be necessary.

The fitting or member 22 is provided with or secured to a stuffing box 36 through which passes a stem 37, and arranged in line with the stem 37 and at the outer end thereof is another stem 38 which also extends through a stuffing box 39 into the water chamber 40 of the flow regulator and is there connected with the piston or other abutment 41 which receives the pressure of the water in the flow regulator for unseating the gasolene valve 24 and permitting the gasolene or other fluid fuel to pass through the passage 17 and outlet port 20 to the burner. In this action of the device the piston or abutment 41 forces the stem 38 in an outward direction against the outer end of the stem 37 and this in turn forces the valve 32 toward its seat, but before reaching its seat it unseats the valve 24 through the intermediary of the stems 29, 33. After the abutment 41 moves a certain distance under the influence of the water, it uncovers a by-pass passage 42 and thereby permits the water to enter the chamber 40 thence it escapes through a port 43 communicating with boiler pipe 2. In order that the distance which the piston or abutment 41 may move before uncovering the by-pass passage 42 without unseating valve 24, may be regulated or varied to suit the conditions of the apparatus, the stem 38 is made adjustable with respect to its piston 41. Its lower end is screw-threaded in a boss 44 and its outer end is provided with an angular head 45 arranged in a thumb knob 46 whereby the stem 38 may be turned and adjusted. This knob has a notched periphery and is held against accidental movement by a dog 47 passing through a yoke member 48 which connects the stuffing box 39 rigidly with the stuffing box 36. It may be here stated that the packing nuts of these stuffing boxes are similarly held against accidental rotation by similar locking dogs 49.

It is, of course, understood that when the pressure of the water against the abutment or piston 41 is relieved, the piston is returned to its former position by a suitable spring, such as spring 50, while the valves 24, 32 are returned to their former position by the spring 25 and consequently neither the valves 24, 32, nor the stems 37, 38 are subjected to the objectionable strain which they would otherwise receive from the spring 50 if the stems 37, 38 were connected with the valves. The return movement of the piston 41 under the influence of the spring 50 is, in this example of the invention, limited by stops 51, thereby leaving a receiving chamber 52 at the end of the flow regulator, with which communicates the inlet port 53 for the water coming from the boiler supply pump 54 through any suitable pipe connections 55, 56. In this class of steam generating systems the boiler supply pump is ordinarily connected with and operated by the engine as long as the latter is in operation, thereby keeping up a constant flow of water into the steam generator 1 if the conditions are such as to require a continuous supply, and if not, the construction is such as to throw the discharge port of the pump into communication with its inlet port. This arrangement is best indicated in Fig. 2 of the drawings and it will be seen that the pipe 55 which leads from the discharge port 57 of the pump communicates also with a branch pipe 58 leading to inlet port 59 of the before-mentioned device for opening the by-pass by the pressure of the steam in the generator 1. This device is shown as consisting of a housing 60, having a valve seat 61 interposed between the inlet port 59 and an outlet port 62, and a valve 63 arranged to close against this seat under the influence of a spring 64 and to be forced away from the seat by a diaphragm 65 under the influence of the steam boiler pressure admitted to said diaphragm through a pipe 66, the outlet port 62 being in communication with the inlet valve 67 of the pump through a suitable connection 68. Consequently, when the pressure in the boiler or generator 1 rises beyond the predetermined normal for which the spring 64 is set, the by-pass valve 63 will be opened more or less and more or less of the water pumped by the pump 54 will pass back again into the intake side of the pump instead of being forced through the pipe 56 past the pipe 41 of the flow regulator and eventually into the generator and in its passage to the generator serving to open the fuel valve 24 more or less. The pump 54 may be supplied, of course, from any suitable source, such as a tank 69 and pipe 70.

The described means provides a system which is automatic in its action and serves to automatically maintain the pressure in the generator at a predetermined normal. As the conditions of the road over which motor vehicles are ordinarily employed are continually varying, and the quantity of steam in flash boilers or semi-flash boilers at any one time is very small or limited, making a certain boiler pressure inadequate at one time and superfluous at another, it becomes necessary to provide these automatic agencies with manually operative means whereby this pressure and quantity of steam may be increased and maintained at will, or whereby it may be brought up to normal in the event of failure on the part of any of the automatic devices. In order, therefore, that the fuel valve 24 may be opened or closed at will without interfering with its automatic character at other times, the stem 37 is provided with manually operative means. This may consist of any suitable agency accessible to the foot or hand of the operator. For causing the valve 24 to close, I employ a foot button 71 arranged above the floor 72 of the vehicle on a stem 73, which is connected with one arm 74 of a bell crank lever which has a bifurcated arm 75 straddling yoke member 48 and engaging trunnions 76 on the stem 37, the said lever being pivoted on pin 77 to the yoke member 48. Interposed between the button 71 and the floor 72 is a spring 78 which serves to lift the button to its normal position after being pressed and which also serves to return the stem 37 and parts related thereto to their former position. It is sometimes desirable to open the fuel valve 24 and hold it in its open position a longer time than would be convenient for accomplishment by the continued pressure of the foot of the operator and in order that it may be thus opened and locked as long as desired, the aforesaid bell crank lever is provided with a third arm 79 pivoted to a stem 80 passing through the floor 72 and having a foot button 81, the stem 80 being oscillatory and provided with a locking block 82 arranged in a slot 83 in the floor 72 and having laterally projecting lugs 84 which are adapted to engage under the floor 72 or a plate secured to the floor, at one time, and thus hold the stem 80 depressed, or to rise through notches 85, at another time, to permit the stem 80 to rise. It is also apparent that this foot button 81 may be utilized for forcing the valve 32 firmly against its seat and thereby keeping the fuel shut off as long as required, the locking block 82 being adjustable on its stem 80 so that the position of the valve 32 with relation to its seat when the stem 80 is locked in its depressed position, may be gaged according to requirements.

As before mentioned it sometimes occurs that the automatic by-pass valve 63 will be open and thereby prevent the water from reaching the steam generator at a time when the maximum supply may be required, as, for example, when ascending steep grades, and in order that this automatic action of the by-pass valve may be rendered ineffectual at the will of the operator, the by-pass pipe 58 is provided with a manually operative valve 86. This is held normally open by a spring 87 or suitable automatic means supported on the floor 72 under a foot button 88 capable of closing the valve 86 through the intermediary of a stem 89, a bell crank lever 90 and a link 91, which is pivoted to the arm 92 of the valve 86. A detail of this valve which need not be different from ordinary constructions is shown in Fig. 19.

In Fig. 20 of the drawing is shown a modification of the flow regulator. Instead of employing the piston or solid abutment 41, this form of the device employs a flexible diaphragm 93 and instead of securing the stem of the abutment into the abutment, such stem, which is shown at 94, is secured to a head 95 at its inner end bearing against the diaphragm 93 and at its outer end as provided with an adjusting screw 96 abutting against the lower end of a screw-threaded enlargement 97 formed in the outer end of a stem 98 which corresponds to the stem 37. By means of the screw 96, therefore, the stem 98 may be adjusted with relation to the stem 94 and in order that the screw 96 may be rotated for this purpose, it is provided with a squared head 99 engaged by notched plate or disk 100, capable of being rotated through the open sides of yoke 101 and capable of being locked in position by one or more dogs 102 engaging its notched periphery and formed on a spring 103. The valve stem 98 is connected to a valve 104 which corresponds to the valve 32 and this in turn is connected to a valve 105 (by stem 106) which corresponds with the valve 24 and is held to its seat by a spring 107, similar to the spring 25. In this form of the flow regulator, the water pressure is admitted to the abutment 93 through a port 108 and pipe 109 connected at any suitable point in the system with the discharge side of the pump, but unlike the other flow regulator, the water which is admitted to the abutment 93 or 41 does not pass through the flow regulator into the boiler. In this form also the fuel valves may be manipulated manually at the will of the operator through the lever arms 74, 75, 79, the arm 75 being operatively connected to the stem 98 by means of a divided nut 110 carrying trunnions 111 with which the bifurcated end of the lever 75 engages.

Having thus described my invention, what I claim as new and desire to secure by Letters Patent is—

1. In an apparatus for the purpose described, the combination of a steam generator, liquid forcing means for supplying said generator with the liquid to be vaporized, a burner for fluid fuel arranged to heat the generator, a source of supply for said burner, a valve interposed between the burner and the source of supply for controlling the amount of fuel admitted to the burner, thermostatic means operatively related to the generator for closing said valve when the heat of the generator reaches a certain degree, a second valve interposed between said first valve and the burner, also for reducing the supply of fuel to the burner, a flow regulator subjected to the pressure of the liquid discharged by said liquid forcing means, having operative relation to said second valve, and manually operative means for closing said second valve independently of said flow regulator.

2. In an apparatus for the purpose described, the combination of a steam generator, liquid forcing means for supplying the generator with the liquid to be vaporized, a burner for fluid fuel arranged to heat the generator, thermostatic means operatively related to the generator for altering the supply of fuel to the burner when the heat of the generator reaches a predetermined degree, a valved by-pass connecting the outlet and the inlet sides of said liquid forcing means together, means for opening the valve of said by-pass by the pressure in the generator, means for closing said by-pass manually at will, and a flow regulator subjected to the pressure in said by-pass and operatively related to the burner for altering the supply of fuel to the burner by the pressure of the liquid in said by-pass.

3. In an apparatus for the purpose described the combination of a steam generator, a liquid forcing means for supplying the generator with a liquid to be vaporized, a by-pass connecting the inlet side of the liquid forcing means with its outlet side, pressure controlled means operatively related to the generator for opening the said by-pass automatically, a manually actuated valve also arranged in said by-pass for closing it at will, and means for automatically opening said manually operated valve.

4. In an apparatus for the purpose described the combination of a steam generator, liquid forcing means for supplying the generator with the liquid to be vaporized, a by-pass connecting the inlet side of the liquid forcing means with its outlet side, a valve for closing said by-pass, pressure controlled means operatively related to the generator and to said valve for opening the valve automatically, means independent of said pressure controlled means for closing the by-pass manually at will, a second pressure controlled means connected with the outlet side of said liquid forcing means and also with said by-pass, a burner for heating the generator embodying a passage for fluid fuel, and means operatively connected with the second said pressure controlled means for regulating the said fuel passage.

5. In an apparatus for the purpose described the combination of a steam generator, means for forcing the liquid to be vaporized into said generator, a burner for fluid fuel associated with a fluid fuel passage for heating said generator, a flow regulator means subjected to the pressure of the said liquid forcing means for altering the supply of fuel to the burner, and said flow regulator means embodying a valve for closing said passage when the pressure of the flow of said liquid decreases, a second valve arranged to close said passage, operatively related to the flow regulator means and also to said first valve for opening the latter, and a manually actuated means operatively connected with said second valve.

6. In an apparatus for the purpose described the combination of a steam generator, means for forcing the liquid to be vaporized into said generator, a burner for fluid fuel associated with a fluid feed passage for heating said generator, flow regulator means subjected to the pressure of the said liquid forcing means for also altering the supply of fuel to the burner, said flow regulator means embodying a valve for closing said passage when the pressure of said liquid decreases, and manually actuated means for opening said valve independently of the flow regulator means.

7. In an apparatus for the purpose described the combination of a steam generator, means for forcing a liquid to be vaporized into said generator, a burner for fluid fuel associated with a fluid fuel passage for heating said generator, flow regulator means subjected to the pressure of the said liquid forcing means for altering the supply of fuel to the burner, said flow regulator means embodying a valve for closing said passage when the pressure of said liquid decreases, and manually actuated means operatively related to the valve and to the fuel regulator means for permitting the valve to close independently of the automatic action of said flow regulator means.

8. In an apparatus for the purpose described, the combination of a flash boiler or semi-flash boiler, liquid forcing means for supplying said boiler with a liquid to be vaporized, a by-pass for connecting the inlet side of the liquid forcing means with its outlet side, a valve for closing said by-pass, pressure controlled means operatively related to the boiler for opening said by-pass, means independent of said pressure controlled means for closing said by-pass manually at will, a burner for heating the boiler, and a flow regulator subjected to the pressure of said liquid forcing means for controlling the fuel supply to the burner.

9. In an apparatus for the purpose described, the combination of a flash boiler or semi-flash boiler, liquid forcing means for supplying said boiler with a liquid to be vaporized, a by-pass for connecting the inlet side of the liquid forcing means with its outlet side, a valve for closing said by-pass, pressure controlled means operatively related to the boiler for opening said by-pass, manually operative means independent of said pressure controlled means for closing said by-pass manually at will, means for automatically opening the last said by-pass closing means, a burner for heating the boiler, and a flow regulator subjected to the pressure of said liquid forcing means for controlling the fuel supply to the burner.

10. In an apparatus for the purpose described, the combination of a flash boiler or semi-flash boiler, liquid forcing means for supplying the boiler with a liquid to be vaporized, a by-pass for connecting the inlet side of the liquid forcing means with its outlet side, a valve for closing said by-pass, pressure controlled means operatively related to the generator for opening said by-pass, means independent of said pressure controlled means for closing said by-pass manually at will, embodying a valve, a lever connected with said valve for operating it, and a key or pedal accessible to the operator connected with said lever.

11. In an apparatus for the purpose described, the combination of a steam generator, a burner for fluid fuel, a pressure controlled means operatively related to the burner and generator for controlling the fuel supply when the pressure in the generator fluctuates between certain degrees, said means embodying a fluid passage, a valve for closing said passage, and fluid influenced means adapted to open said valve, the said fluid influenced means being separate from the valve mechanism and adapted to close the valve and disconnected from said valve so as to be moved in one direction independently thereof, and manually operated means connected with said valve for operating the same at will independently of the said fluid controlled means.

In testimony whereof I have signed my name to this specification, in the presence of two subscribing witnesses, on this 20th day of September A. D. 1907.

ROBERT MIEHLE.

Witnesses:
 FRANCIS A. HOPKINS,
 CHARLES H. SEEM.